United States Patent [19]

Votava

[11] 4,337,316

[45] Jun. 29, 1982

[54] SANITARY WARE AND PROCESS OF PRODUCTION

[75] Inventor: Werner F. Votava, Broadview Heights, Ohio

[73] Assignee: Ferro Corporation, Cleveland, Ohio

[21] Appl. No.: 188,919

[22] Filed: Sep. 19, 1980

[51] Int. Cl.$^3$ .................. C03C 5/00; C03C 3/04; C03C 3/22; C04B 33/00

[52] U.S. Cl. .................. 501/21; 106/313; 501/5; 501/24; 501/63; 501/70; 501/73; 501/141; 501/142; 501/143

[58] Field of Search .................. 106/48, 39.6, 313, 52; 501/5, 21, 24, 63, 70, 73

[56] References Cited

U.S. PATENT DOCUMENTS

| | | |
|---|---|---|
| 1,855,115 | 4/1932 | Peddrick et al. . |
| 2,024,407 | 12/1935 | Weis . |
| 2,207,911 | 7/1940 | Cannon . |
| 2,261,884 | 11/1941 | Koenig .................. 106/313 |
| 2,621,131 | 12/1952 | Lathe . |
| 3,149,983 | 9/1964 | Maris et al. . |
| 3,819,387 | 6/1974 | Leger et al. .................. 501/5 |
| 3,900,329 | 8/1975 | Grubb et al. .................. 501/70 |
| 3,904,423 | 9/1975 | Guthrie .................. 501/70 X |
| 3,926,647 | 12/1975 | Wuhrer . |
| 3,941,604 | 3/1976 | Boyce . |
| 4,009,015 | 2/1977 | McCollister .................. 501/5 X |
| 4,102,692 | 7/1978 | Schartau et al. .................. 501/70 X |
| 4,113,500 | 9/1978 | Ebihara et al. . |
| 4,142,907 | 3/1979 | Manring et al. . |

FOREIGN PATENT DOCUMENTS 1149840 6/1963 Fed. Rep. of Germany ..... 106/39.6

OTHER PUBLICATIONS

Maretheu, A. et al. "Utilisation Laitiers Siderurgiques pourla fabrication de carreaux defaience" L'Industrie Ceramique, Jun. 1969, No. 619, pp. 405–414.

Yanusov, K. et al. "Effect of Boron Oxide on the Properties of Frits of Faience Glazes Opacified by Diopside Crystal Particles" Uzb. Khim. Zh. 1973(3), pp. 64–67 (Russ.).

Berezhnoi, Glass—Ceramics and Photo—Sitalls, Plenum Press, NYC (1970) pp. 256–258.

H. G. Kurczyk, "Synthetic Diopside and Synthetic Wollastonite—New Raw Materials for Ceramics" May 27–31, 1976.

Primary Examiner—Helen M. McCarthy
Attorney, Agent, or Firm—Milton L. Simmons

[57] ABSTRACT

A process for producing feldspathic sanitary ware and the end product are disclosed in which a fluxing amount of a glass frit is used in the ceramic slip used to cast the sanitary ware. The frit contains both deflocculent oxides and flocculent alkaline earths which are leachable from the frit when it is placed in the ceramic slip. The deflocculent oxides counterbalance the effect of the flocculent alkaline earths to the extent they are respectively leached from the frit upon dispersal in a ceramic slip and maintain the slip at a workable viscosity. Upon casting and firing the slip, the present frit precipitates fine crystals of diopside having an average particle size of less than one micron which are particularly useful in lowering the firing temperature of feldspathic bodies by promoting the required degree of vitrification at lower temperatures than heretofore possible.

4 Claims, No Drawings

SANITARY WARE AND PROCESS OF PRODUCTION

BACKGROUND AND FIELD OF THE INVENTION

Sanitary-ware fixtures, i.e., toilet bowls, lavatories and the like, particularly the former, are constructed of a glazed, highly vitrified, feldspathic body.

The body is usually formed by the well-known method of slip casting, carefully and slowly dried, glazed and fired to vitrification in a tunnel kiln at a temperature equivalent of Seger pyrometric cone 9 to 10. The body is normally referred to as "feldspathic" indicating that a substantial proportion of the mineral content of the slip is feldspar. However, nowadays feldspathic sand or nepheline syenite can be optionally used as a partial or complete replacement for the feldspar without changing this generic description.

Ideally, and as will be described in more detail hereinafter, the casting slip, as well as the final, fired, vitrified body, must meet certain rigid, rheological and physical property standards.

For example, the viscosity, specific gravity and stability of the casting slip should ideally remain constant over appreciable periods of time as these factors are all critical from the standpoint of casting bodies having desired wall thicknesses, drying shrinkage, etc.

The fired body, ideally, will be completely vitrified, have high strength, with minimum, though uniform, shrinkage on firing.

In an effort to either, or both, speed the firing operation and to lower the firing temperature, any number of body additives have been experimented with. For example, many fluxing materials have been tried to speed the body vitrification process, with varying degrees of success. However, such fluxes have generally created more problems than they have solved.

That is, speeding up the vitrification process poses no major problem, in and of itself; but slip instability, excessive shrinkage or warpage on drying or firing, lower strength, short vitrification range, etc., have usually accompanied the utilization of conventional body fluxes used heretofore. By way of explanation, "short vitrification range" refers to the temperature spread, within a commercial kiln, over which the required degree of vitrification will both occur and be sustained without slumping and/or crystallization (devitrification).

Therefore, while a vitrification range would be of little or no significance in a small test bar, fired under carefully controlled laboratory conditions, it is vital to successful manufacture of sanitary-ware products on a commercial scale in a continuous production tunnel kiln. Thus, if a sanitary-ware body reaches vitrification at precisely cone 10 down, while at cone 9 it is not vitrified, whereas at cone 11 it has begun to slump, the production problems become readily apparent because there is no practical way to achieve temperature control at precisely cone 10 throughout the cross section of the firing zone of a production kiln.

A related problem in casting sanitary ware from a ceramic slip in which a glass frit serves as a flux is that the frit tends to be somewhat soluble. Components leached from the frit, notably the alkaline earths, act as flocculents and can sufficiently raise the viscosity of the slip to make it unworkable. In fact, some slips may even virtually solidify. Moreover, this flocculation to an unworkable viscosity can often take place in a relatively short time. Also, sintering of the cast ceramic slip leaves a certain amount of unreacted alkaline earth in the sintered product. This likewise has an undesirable flocculating effect on the slip.

The field of this invention deals primarily with the production of sanitary-ware body additives designed to lower the production firing temperature of a sanitary-ware body, while at the same time preserving all the required characteristics of said body in both the slip stage, as well as in the final, fired product. Further, the invention includes a counterbalancing of flocculents leached by the slip from fluxing frit and a resulting maintenance of a workable viscosity of the slip.

The utilization of either wollastonite ($CaO.SiO_2$) or diopside ($CaO.MgO.2\ SiO_2$) as an additive for ceramic bodies is disclosed by H. G. Kurczyk in a paper entitled, "Synthetic Diopside and Synthetic Wollastonite—New Raw Materials for Ceramics", from the Proceedings of the 3rd CIMTEC, 3rd International Meeting on Modern Ceramics Technologies at Rimini, Italy, May 27-31, 1976.

Kurczyk discloses the possibility of synthesis of diopside by any number of means, including synthesis by solid-state reaction, crystallization from a molten bath, sintering, etc. Kurczyk's preferred method apparently is the formation of diopside from dolomite and ground quartz in the appropriate molecular ratio by hydrothermal pretreatment and calcination.

However, diopside produced by sintering, from the standpoint of adaptability to ceramic bodies, has a number of drawbacks. First, the sintering process utilizes a rotary kiln operation similar to that used for the manufacture of portland cement clinker. As is well known, it is exceedingly difficult to control the firing temperature in a rotary kiln with any degree of precision, wherein variations in temperature may promote either a "soft burn", resulting in a high percentage of unreacted material, or cause a partially molten bath which solidifies upon discharge from the sintering zone, resulting in the formation of a non-uniform, heavy, slag-type coating on the calciner walls with attendant undesirable interruptions in the overall operation.

Furthermore, the diopside produced by the method disclosed by Kurczyk is relatively large grained (10 to 30 microns) which tends to reduce its effectiveness in lowering the firing temperature of a sanitary-ware body and, as is well known, the diopside mineral crystal tends to be extremely hard and tough, thereby making it most difficult to mill and grind to a particle size small enough to be effectively dispersed throughout a sanitary-ware body slip.

It has been found however that, if the molten bath which Kurczyk found to be undesirable, is deliberately created under controlled conditions, followed by the novel processing steps hereinafter set forth, a more economically produced, superior form of diopside is achieved, which eliminates all the disadvantages of Kurczyk, while providing a number of additional improvements thereover.

OBJECTS

It is therefore an object of this invention to provide a new and improved crystalline form of diopside.

It is another object of this invention to provide a relatively low temperature glass matrix from which fine grained diopside crystals may be formed upon reheating said glass to its crystallization temperature.

It is yet another object of this invention to provide diopside precursors in glass solution in a relatively low melting temperature glass, which glass may be readily incorporated into a ceramic body, and which glass, upon firing of the body, will precipitate at least some fine grained crystalline diopside, uniformly dispersed and formed in situ throughout said body.

It is yet another object of this invention to provide a vitreous source of fine grained diopside crystals which can be easily and readily milled to a sufficient fineness for incorporation into a feldspathic ceramic body.

It is another object to achieve a process for manufacturing the relatively low temperature glass of this invention.

It is a further object to counteract flocculents leached by a slip from glass and prevent their increasing the viscosity of the slip to unworkable values.

And finally, it is an object to provide a new and improved, sanitary-ware body, as well as provide the process for achieving same.

SUMMARY OF THE INVENTION

The present invention reduces the firing temperatures of vitreous and semi-vitreous bodies comprising feldspathic materials, while maintaining a suitable firing range and other physical properties of such material. As a result, there is substantial fuel savings with increased productivity. By substantially balancing the defloculent oxides and flocculent alkaline earth extractabilities from the glass added to a slip, its viscosity can be maintained within workable limits.

In one form of the invention, the glass hereof in the form of a finely ground frit is mixed with the ceramic material to be fired to form a feldspathic body. The frit contains in solution quantities of the oxides contained in diopside, namely MgO, CaO, and $SiO_2$, and is so formulated that when heated above a certain temperature (as during the firing of the ceramic body) fine grained diopside crystals precipitate out and act as a flux, lowering the firing temperature substantially, for example, at least three Seger cones as compared to the firing temperature that would be required without the diopside crystals. The frit contains leachable deflocculent oxides which counterbalance any flocculent alkaline earths leached therefrom and prevent thickening of the slip to an unworkable viscosity.

DESCRIPTION OF THE PREFERRED EMBODIMENTS

In accordance with the present invention, a glass frit containing in solution the diopside precursors CaO, MgO, and $SiO_2$, is incorporated with a ceramic material that is shaped into a body and fired to achieve the desired degree of vitrification. During the firing, diopside forms from the precursors and precipitates as fine crystals which serve as a flux. The crystalline, fluxing diopside substantially lowers the firing temperature required of the ceramic material in forming the sanitary-ware or other body.

Considering these components in greater detail, the diopside precursors, CaO, MgO, and $SiO_2$, should comprise at least 35% by weight of the glass. For example, such a glass may comprise in weight percent about:

| CaO | 3.5 to 45.0 |
| MgO | 2.5 to 30.0 |
| $SiO_2$ | 30.0 to 78.0 |
| Additive | 5.0 to 20.0 | the additive being selected from one or more of the following in approximately the percent indicated based on the total weight of the glass:

| $Li_2O$ | 0 to 5 |
| SrO | 0 to 5 |
| ZnO | 0 to 5 |
| $K_2O$ | 0 to 5 |
| $Na_2O$ | 0 to 10 |
| $Al_2O_3$ | 0 to 12 |
| $ZrO_2$ | 0 to 20 |
| $MoO_2$ | 0 to 2 |
| PbO | 0 to 5 |
| $CeO_2$ | 0 to 2 |
| F | 0 to 10 | the fluorine when present being introduced into the batch as a fluoride of at least one metal of the composition.

A more desirable composition comprises in weight percent about:

| CaO | 15 to 25 |
| MgO | 10 to 20 |
| $SiO_2$ | 35 to 50 |
| Additive | 5 to 20 | the additive being selected from one or more of the following in approximately the percent indicated based on the total weight of the glass:

| $K_2O$ | 0 to 3 |
| $Na_2O$ | 0 to 5 |
| $Li_2O$ | 0 to 3 |
| $Al_2O_3$ | 0 to 10 |

A preferred compositional range and a preferred composition for the glass containing the diopside precursors are in weight percent about:

| Ingredient | Range | Percentage |
| --- | --- | --- |
| CaO | 3.5 to 40.3 | 22.1 |
| MgO | 2.6 to 26.0 | 18.4 |
| $SiO_2$ | 30.0 to 76.3 | 46.0 |
| $Al_2O_3$ | 5.0 to 12.0 | 9.25 |
| $K_2O$ | 0 to 2.3 | 1.4 |
| $Na_2O$ | 0 to 4.6 | 2.5 |
| $Li_2O$ | 0 to 0.2 | 0.1 |

It will be appreciated that these compositions constitute metal oxide analyses of the smelted glass. The corresponding batch materials may constitute those materials which on smelting and cooling yield the oxide analysis. For example, the present glasses can be smelted from dolomite and lithospar in a weight ratio of about 76:24 to 11:89, respectively. Whiting can be substituted for a relatively small portion of the dolomite, and any of the other ingredients optionally included can be added to the batch, either in the oxide or salt form or in a form which reduces to the metal oxide or fluoride form on smelting. For example, spodumene, lepidolite, and the like may constitute part of the batch formulation.

Compositions with the ranges disclosed melt at temperatures approximating about 2600° F. to about 2750°

F. The melt may be fritted in any convenient manner, such as by quenching the melt in water or passing it between fritting rollers. The frit so obtained is conventionally ground prior to use. As an example, the frit may be ground so that about 95% passes through 325 mesh, U.S. Standard Sieve. X-ray examination shows that the frit is totally vitreous or nearly so.

A glass of the type described, containing the diopside precursors, is incorporated with suitable ceramic material that is adapted to form sanitary ware, and the mixture is then shaped into a body, as by slip casting. The body is then fired to yield the sanitary ware. As described more fully hereinafter, the present glass does not significantly affect the casting properties of the slip, and its viscosity may be controlled by providing counteracting or counterbalancing leachable amounts of deflocculent. In contrast other commercial glasses can markedly affect slip properties in a deleterious way.

A preferred ceramic material used to form the body is a feldspathic one, that is, bodies in which a substantial portion of the mineral content is feldspar.

In accordance with the present invention, the temperature of firing is lower by at least three Seger cones than would be required without the presence of the instant glasses. Any addition of a present glass effects some reduction in the firing temperature of the ceramic body. Amounts as little as 0.1% by weight of the body to as much as 10% or more are useful. However, the preferred range of the glass is about 3% to about 5% by weight of the ceramic body.

Upon firing a ceramic body containing a present glass, the described precursors precipitate in situ in the body as very fine crystals of diopside. In one instance, it was observed that the glass crystallized at about 1652° F. (900° C.), although this temperature is not critical. Upon such crystallization, at least about 50% by weight of the instant glass converts to crystalline diopside, the balance forming a glassy residue.

The crystals formed are extremely fine and this is believed to be quite advantageous. A substantial portion of the crystalline diopside formed has an average particle size less than one micron. Diopside formed in accordance with the present invention is a better body flux than synthetic diopside. This is believed to be due at least in part to the fine grained nature of the diopside formed which leads to faster dissolution in the subsequent fluxing action. This fluxing action accorded by the present glasses is so effective that it lowers the required firing temperatures at least three Seger pyrometric cones and typically from cone 10 to 12 to cone 5 to 6, while still retaining a good, sufficiently wide firing temperature and reducing warpage.

X-ray diffraction results from fired mixtures of the present glasses with feldspathic bodies show that no new compounds are formed other than the diopside crystals. A progressive glass formation appears to take place by fusion of the feldspathic matrix and assimilation of the diopside crystals.

For purposes of comparing the benefits and degree of utility of the present invention with that which has been practiced in the past, the following is exemplary of a conventional cone 9–10 body composition used heretofore:

| Cone 9–10 Body Composition | Weight % |
|---|---|
| Plastic Ball Clay | 34.0 |
| Kaolin | 16.0 |
| Flint (200 Mesh) | 18.0 |
| Feldspar | 32.0 |
| | 100.0 |
| Water | 37.5 |
| $Na_2SiO_3$ | As required |

The composition of the feldspar was essentially $KNaO.Al_2O_3.6SiO_2$.

The sodium silicate was added as a 50% aqueous solution sufficient to achieve an initial slip viscosity as measured on a Brookfield viscosimeter on either a #3 or a #5 spindle at 10 RPM.

The foregoing sanitary-ware body composition was cast into test bars having the dimensions one cm. by one cm. by 10 cm., and measured for firing and total shrinkage, absorption and warpage, the results, from cone 8 to cone 11, tabulated below in Table 1.

TABLE I

| Firing Temperature | % Firing Shrinkage | Absorption | Warpage | % Total Shrinkage |
|---|---|---|---|---|
| Cone $8^{D9^2}$ | 9.35% | 0.62% | 0.021" | 11.85% |
| Cone $9^{D10^1}$ | 9.53% | 0.03% | 0.022" | 12.03% |
| Cone $10^{D11^1}$ | 9.59% | 0.01% | 0.030" | 12.09% |
| Cone $11^{D12^1}$ | 9.17% | 0.27% | 0.033" | 11.67% |

The foregoing physical characteristics, as well as those which are reported in the following tables, were arrived at as follows:

Percentage Firing Shrinkage

This was determined as being the difference between dried length and fired length, divided by the dried length and multiplied by 100 to provide the indicated percentage.

In this regard it should be noted that, at least theoretically and predictably, the lower the shrinkage, generally the better.

However, because existing commercial molds have been designed to provide a finished article in contemplation of 10% shrinkage, the body as described below, utilizing the instant invention, has been compounded to provide approximately 10% shrinkage to eliminate the need for extensive commercial mold redesign at this time.

Percentage Absorption

Percentage absorption was obtained using ASTM test method C373-72.

An absorption of approximately 0.5% or less is generally necessary to assure a sufficiently vitrified body. Considering the use to which sanitary ware is put, and further considering that not every square inch of surface exposed to water will be glazed, the need for a high degree of vitrification will be readily apparent.

Warpage

Warpage was measured on test bars supported over a five inch span during firing, the measurement, after cooling to room temperature, taken two and one half inches from either support at the midpoint, using a depth gauge, the droop being taken as a measure of the degree of warpage, reported in inches.

A warpage of 20 mils, slightly more or less, is considered to be about the norm, and would be expected to produce commercially acceptable ware. Anything materially beyond 20 mils would likely result in commercially unacceptable fixtures.

Percent Total Shrinkage

This figure was determined essentially the same as firing shrinkage, except the initial measurement was made while the test bar was still in the plastic state, prior to drying.

Modulus of Rupture

Modulus of Rupture was calculated using the standard formula:

$$M = 3Pl/2bd^2$$

where

M = the modulus of rupture in pounds per square inch;
P = the breaking load, in pounds;
l = the distance between the knife edges in inches;
b = the breadth of the bar in inches;
d = the depth of the bar, in inches.

Modulus of rupture of course is a measure of the strength of the fired body. Commercial sanitary ware under our experimental conditions yields modulus of rupture values of about 7000 pounds per square inch, and this may be compared with experimental body values shown in Table IV.

To comparatively demonstrate the effectiveness of the instant invention in substantially lowering both the firing temperature, as well as the time of firing of a sanitary-ware body, the following cone 5–6 base body composition was used:

| Cone 5–6 Base Body Composition | Parts by Weight |
|---|---|
| Plastic Ball Clay | 34.0 |
| Kaolin | 16.0 |
| Flint (200 Mesh) | 12.5 |
| Feldspar | 32.5 |
| | 95.0 |
| ($Na_2SiO_3$ and water as necessary) | |

It will be seen that, but for a slight reduction in $SiO_2$, the above base body composition is essentially the same as that set forth above for cone 9–10 processing.

Using the cone 5–6 base body composition as just given as the feldspathic body, there is tabulated in the following Table II the components of a series of sanitary-ware slips which were weighed and mixed with various auxiliary components added as noted and the viscosity, as with the cone 9 body, adjusted with a 50% solution of $Na_2SiO_3$.

TABLE II

| Parts Are by Weight | | | | | | |
|---|---|---|---|---|---|---|
| Body Compositions | 1 | 2 | 3 | 4 | 5 | 6 |
| Base Composition | 950 | 970 | 985 | 970 | 985 | 970 |
| Flux A | — | 30 | 15 | — | — | — |
| Flux B | — | — | — | 30 | 15 | — |
| Flux C | — | — | — | — | — | 30 |
| | 950 | 1000 | 1000 | 1000 | 1000 | 1000 |
| Water | 375 | 375 | 375 | 375 | 375 | 375 |
| Body Compositions | 7 | 8 | 9 | 10 | 11 | 12 | 13 |
| Base Composition | 970 | 970 | 970 | 970 | 970 | 985 | 970 |
| Synthetic Diopside | 30 | 15 | — | — | — | — | — |
| Residual Glass | — | 15 | — | — | — | — | 15 |
| Calcined Dolomite | — | — | 12 | — | — | — | — |
| Lithospar | — | — | 17.5 | 8.7 | — | — | — |
| Dolomite | — | — | — | 21.3 | — | — | — |
| Vitreous Diopside | — | — | — | — | 30 | 15 | 15 |
| | 1000 | 1000 | 1000 | 1000 | 1000 | 1000 | 1000 |
| Water | 375 | 375 | 375 | 375 | 375 | 375 | 375 |

Referring in more detail to the fluxes listed in Table II, Flux A was a high calcium, alumina silicate glass having a refractive index of 1.65. Flux B was a glass flux purchased on the open market and is understood to comprise ground window glass having a coating to make the glass particles more water resistant. Flux C was a glass of the present invention and comprised in weight percent:

| | |
|---|---|
| $SiO_2$ | 46.0 |
| $Al_2O_3$ | 9.25 |
| CaO | 22.1 |
| MgO | 18.4 |
| $Na_2O$ | 2.5 |
| $K_2O$ | 1.4 |
| Impurities | 0.35 |
| | 100.00 |

The flux indicated as residual glass comprised the composition just given minus the diopside precipitated therefrom. That is, the oxides remaining in Flux C after the combination of some of the MgO, CaO and $SiO_2$ to give diopside crystals (50% by weight of the flux) were used as the constituents of the residual glass flux. Body 13 would thus be chemically the same as body 6, though the oxides are combined differently. Bodies 9 and 10 were made to illustrate that the raw materials from which Flux C could be made by melting cannot be used as such in the casting slip. Vitreous diopside was prepared by melting dolomite and quartz in the proportions 184:120 by weight, respectively, to yield a composition containing MgO, CaO and $SiO_2$ in the proportions present in diopside and quenching to form a glass.

The following Table III lists the viscosity measurements for each body composition set forth in Table II.

TABLE III

Stability of Slips of Table II
Brookfield Viscosity in Poises

| Body Composition | $Na_2SiO_3$ ml/Kg of Slip | Initial Visc. | Aged 1 Day | Aged 2 Days | Aged 3 Days |
|---|---|---|---|---|---|
| 1 | 5 | 19.9 | 10.6 | 9.6 | 9.0 |
| 2 | 6.5 | 20.4 | 30.0 | 42.2 | 67.5 |
| 3 | 5.75 | 16.5 | 55.3 | 61.0 | 184.0 (#5 Spindle) 1 ml $Na_2SiO_3$ |
| 4 | 5.3 | 36.1 | 13.0 | 10.3 | 9.1 |
| 5 | 5.2 | 29.4 | 10.0 | 8.1 | 7.2 |
| 6 | 5.0 | 16.0 | 27.8 1 ml $Na_2SiO_3$ | 15.3 | 20.2 |
| 7 | 7.25 | 23.8 | 38.3 | 31.8 | 36.4 |
| 8 | 5.75 | 23.9 | 370.4 (#5 Spindle) 1.75 ml $Na_2SiO_3$ | 21.5 | 9.3 |
| 9 | - Addition of calcined dolomite set the slip up and it could not be deflocculated. | | | | |
| 10 | - After one day slip was too viscous to remove from container. | | | | |
| 11 | 5 | 26.1 - Too viscous to remove from container. | | | |
| 12 | 5 | 18.0 - Too viscous to remove from container. | | | |

TABLE III-continued

Stability of Slips of Table II
Brookfield Viscosity in Poises

| Body Composition | Na₂SiO₃ ml/Kg of Slip | Initial Visc. | Aged 1 Day | Aged 2 Days | Aged 3 Days |
|---|---|---|---|---|---|
| 13 | 5 | 16.5 - Too viscous to remove from container. | | | |
| 14 | 4 | 19.0 | 10.9 | — | 12.2 |

Body composition 14 in Tables III and IV represents the cone 9-10 body composition previously given. The sodium silicate was added to the slips to deflocculate the clay. The Brookfield viscosities were determined with No. 3 Spindle at 10 rpm. except for Body Compositions 3 and 8 where No. 5 Spindle was used with additional sodium silicate as indicated by a lower entry line for late aging periods for those compositions. Similarly, an added amount of sodium silicate was used for Body Composition 6 for testing at the aging level of two days and more.

Referring to Table III, Body Compositions 1 and 14 show the normal gradual reduction of viscosity with age. Body Compositions 2 and 3 with Flux A required more sodium silicate for initial deflocculation than did Body Composition 6 containing a flux of the present invention. Body Compositions containing Flux A also showed a thickening tendency on aging. Similarly, the synthetic diopside required more sodium silicate for initial deflocculation than the present Body Composition 6, and the viscosity of the former increased with age. When calcined dolomite was added, the slip, thickened to a thick paste and it was not possible to deflocculate it (Body 7). Body Compositions 10, 11, 12 and 13 all caused their respective slips to thicken to a stiff paste after one day.

Critical data from the standpoint of the finished, fired piece, are set forth in Table IV. Only Body Compositions 2, 4, 6 and 7 even approached vitrification at a temperature of cone 6. Body Compositions 11, 12 and 13 thickened very rapidly on aging and were impractical for use in a casting slip. Of the remaining compositions, only Body Compositions 6 and 7 gave lower absorptions.

firing temperature was effectively reduced from cone 9-10 to cone 5-6. At the same time, the fired products still contained, in addition to relative ease of processing, those critical characteristics so essential to commercial success, namely, firing shrinkage, absorption, warpage, and modulus of rupture. These properties are all well within the values required by the trade. It will also be observed that other additives, even synthetic diopside, when added to the feldspathic body provided a number of serious drawbacks. The fluxing glasses of this invention have excellent properties in all categories needed for fluxing action and are not outstanding in just a few of such categories.

Another aspect of the invention resides in balancing the deflocculent oxides and flocculent alkaline earths that are gradually leached from the fluxing glass frit when it is added to the ceramic slip. Such balancing imparts or improves slip stability, that is, it maintains the viscosity of the slip at workable viscosity values.

More particularly, as the alkaline earths are leached from the frit, they tend to raise the viscosity and even solidify the slip. But if the deflocculent oxides are leached along with the flocculents, the deflocculent oxides counterbalance or counteract the deflocculents to provide a stable, workable slip viscosity. Deflocculent oxides include any metal oxide that may be made a component of the glass frit and which counteracts as described the flocculating action of the alkaline earths. Examples of these are the alkali metal oxides such as sodium oxide, potassium oxide, and lithium oxide. After leaching from the glass, the deflocculent oxides are usually present in the slip as silicates such as sodium silicate, potassium silicate, and lithium silicate.

The amount of deflocculent oxides needed in the glass frit depends on how much flocculent alkaline earths are leachable from the glass. Normally, however, at least 5% by weight of the glass frit should be deflocculent oxides. The amount leached for both the deflocculent oxides and the flocculent alkaline earths may be in the parts per million range, although substantially larger concentrations are possible. The absolute amounts leachable for either the deflocculent oxides or flocculent alkaline earths are not so critical as is the

TABLE IV

| Body Composition | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| % Firing Shrinkage | | | | | | | | | | | | | | |
| Cone $4^{D_5 1}$ | 7.1 | 7.1 | 6.7 | 8.7 | 6.7 | 9.1 | 9.5 | 9.4 | — | 7.5 | 9.6 | 8.8 | 9.9 | 7.2 |
| Cone $5^{D_6 1}$ | 8.1 | 8.5 | 8.8 | 9.4 | 8.1 | 9.9 | 9.8 | 9.8 | — | 8.4 | 10.2 | 9.7 | 9.9 | 7.9 |
| Cone $6^{D_7 1}$ | 5776 | — | 8.9 | 9.5 | 8.5 | 10.1 | 10.3 | 9.8 | — | 8.2 | 10.4 | 10.3 | 10.0 | 8.3 |
| % Absorption | | | | | | | | | | | | | | |
| Cone $4^{D_5 1}$ | 4.8 | 4.0 | 4.1 | 3.5 | 3.7 | 2.8 | 2.8 | 2.9 | — | 4.9 | 2.6 | 3.0 | 2.3 | 5.3 |
| Cone $5^{D_6 1}$ | 3.5 | 1.8 | 3.3 | 2.1 | 3.2 | 0.8 | 0.8 | 1.0 | — | 2.9 | 0.3 | 1.4 | 0.4 | 4.2 |
| Cone $6^{D_7 1}$ | 2.7 | 0.8 | 1.5 | 0.7 | 2.2 | 0.3 | 0.3 | 0.2 | — | 2.2 | 0.1 | 0.8 | 0.2 | 3.2 |
| Warpage | | | | | | | | | | | | | | |
| Cone $4^{D_5 1}$ | 0.012 | 0.012 | 0.011 | 0.016 | 0.013 | 0.014 | 0.018 | 0.018 | — | 0.011 | 0.014 | 0.014 | 0.013 | 0.008 |
| Cone $5^{D_6 1}$ | 0.012 | 0.014 | 0.013 | 0.018 | 0.015 | 0.020 | 0.022 | 0.020 | — | 0.016 | 0.025 | 0.019 | 0.027 | 0.013 |
| Cone $6^{D_7 1}$ | 0.017 | 0.018 | 0.019 | 0.027 | 0.019 | 0.021 | 0.023 | 0.023 | — | 0.019 | 0.024 | 0.025 | 0.032 | 0.015 |
| Modulus of Rupture | | | | | | | | | | | | | | |
| Cone $4^{D_5 1}$ | 5019 | 5133 | 4956 | 4070 | 3282 | 5246 | 5564 | 5510 | — | 4032 | 5073 | 3407* | 5418 | — |
| Cone $5^{D_6 1}$ | 4904 | 4389 | 4538 | 5486 | 5424 | 6130 | 6274 | 5457 | — | 5482 | 5878 | 5404 | 5351 | — |
| Cone $6^{D_7 1}$ | 4957 | 5274 | 3973 | 5821 | 5389 | 7203 | 7150 | 6034 | — | 4932 | 5162 | 2845* | 5776 | — |

*Specimen cracked

It will be noted that when using the fritted source of dissolved diopside in accordance with this invention as a body additive in the amounts set forth in Table II, the circumstance that the two alkaline materials be present in amounts sufficient to counterbalance or counteract each other to the extent they are respectively leached from the frit upon its dispersal in a ceramic slip. There results a buffer or neutralization-like effect by which the deflocculent oxides successfully prevent the flocculent alkaline earth from so changing the viscosity of the slip that it becomes unworkable. The net result is even better than adding sodium silicate or the like to the slip after the frit has been added and undergone some leaching away of its solubilities. The present frit is able to maintain relatively constant rheological properties for days following milling, requiring the addition of only minimal amounts of a defloculent such as sodium silicate.

Considering the previous data more fully from the standpoint of balancing the deflocculent oxides and flocculent alkaline earths, Body Compositions 11, 12 and 13 of Table II use vitreous diopside as a flux. The vitreous diopside was prepared by melting the oxides in correct proportions and roll-quenching to form clear, uncrystallized glass having no free (unreacted and undissolved) alkaline earths. As shown by Table III, Body Compositions 11, 12 and 13 within one day were too viscous to be removed from the container. Referring to Table IV, it will be noted that the modulus of rupture for these Body Compositions are extremely poor compared, for example, to that value for Body Composition 6 which embodies the present invention. Test bodies were made from these compositions immediately from the slip while initial viscosity was still workable.

Body Compositions 7 and 8 which comprise synthetic diopside also contained as a result unreacted alkaline earths. Body Compositions 7 and 8 required more sodium silicate because of the free alkaline earths present, but once the effect of the alkaline earths was counteracted, the slip was quite stable as no additional leaching would be expected.

In contrast, Body Composition 6 representing the invention required only a normal amount of defloculent for initially making the casting slip and a slight addition after 24 hours, after which the slip was stable.

The following Table V provides six additional examples of the present glass composition from which frit can be made as described.

TABLE V

Exemplary Glass Compositions For The Present Frit

| Example | A | B | C | D | E | F |
|---|---|---|---|---|---|---|
| $K_2O$ | 1.4 | 1.4 | 1.5 | 1.4 | 1.4 | 1.4 |
| $Na_2O$ | 2.8 | 5.4 | 5.7 | 6.6 | 7.8 | 9.1 |
| $Li_2O$ | 0.1 | 0.1 | 0.1 | 0.1 | 0.1 | 0.1 |
| CaO | 23.9 | 20.5 | 17.1 | 19.5 | 18.5 | 17.5 |
| MgO | 17.8 | 15.2 | 12.6 | 14.5 | 13.7 | 13.0 |
| $Al_2O_3$ | 6.7 | 6.7 | 7.4 | 6.8 | 6.8 | 6.9 |
| $SiO_2$ | 47.3 | 47.3 | 52.1 | 47.6 | 48.2 | 48.4 |
| $P_2O_5$ | — | 3.5 | 3.5 | 3.5 | 3.5 | 3.6 |

Extraction measurements were carried out on powders of Examples A and B of Table V and, for comparison purposes, on the synthetic diopside, glass Flux B, and vitreous diopside of Table II. In each case, one gram of the flux powder having a particle size to pass all but 3% on 325 Mesh, U.S. Standard Sieve, was shaken with 100 milliliters of distilled water for 24 hours. The solution was then filtered and diluted to 250 ml. The elements were estimated on the diluted portion by atomic absorption. Table VI shows the results.

TABLE VI

| | Weight Percent | | | | |
|---|---|---|---|---|---|
| Flux | $Na^+$ | $K^+$ | $Ca^{++}$ | $Mg^{++}$ | pH |
| Example A | 0.11 | 0.08 | 0.36 | 0.01 | 10.9 |
| Example B | 0.10 | 0.02 | 0.03 | 0.04 | 9.9 |
| Synthetic Diopside | 0.01 | 0.01 | 0.15 | 0.02 | 10.1 |
| Glass Flux B | 0.24 | 0.03 | 0.04 | 0.006 | 8.2 |
| Vitreous Diopside | 0.02 | 0.01 | 0.33 | 0.02 | 10.3 |

High $Ca^{++}$ extractions lead to thickening, while high $Na^+$ leads to thinning of the slip. Example A has both high $Ca^{++}$ and reasonably high $Na^+$, so that its behavior is that of a composite. It does thicken the slip somewhat but nowhere nearly as badly as vitreous diopside does. Example B contains more $Na_2O$ than Example A to enhance or maintain $Na^+$ extractability. Table VI indicates that the $Ca^{++}$ extraction from Example B into solution has indeed been drastically reduced, while the $Na^+$ has not been affected.

The glass compositions of Table V are detailed in Table VII with respect to extraction and slip stability.

All casting slips of Table VII have good viscosity stability. The same technique described for Table VI was used in determining the elemental concentrations in weight percent. The casting slip used was the same mix as in Table II, using a three weight percent flux glass, but in addition 1.5 grams of soda ash were added per kilogram of body. All cast bodies using these flux glasses were fired to less than 1% porosity at Seger cone 5. There are differences in the physical conditions of the bodies cast as the glass flux is changed. For instance, the properties may change in hardness to softness, ease of trimming, brittleness to plasticity, and the like. These factors would be factors to consider in selecting a particular glass composition for use with any particular industrial body composition mix. The present invention does, therefore, provide flexibility in the glass composition that may be used without losing slip stability and the usefulness of the composition as a body flux.

TABLE VII

Properties of Glass Fluxes of Table V

| | Weight Percent Extractabilities | | | | | | ml Sodium | Brookfield Viscosity #3 Spindle POISES | | | | Condition |
|---|---|---|---|---|---|---|---|---|---|---|---|---|
| Example | $Na^+$ | $K^+$ | $Ca^{++}$ | $Mg^{++}$ | $P^{5+}$ | pH | Silicate Used | Ready for Casting | 1 Day | 2 Days | 5 Days | of Cast |
| A | 0.11 | 0.08 | 0.36 | 0.01 | — | 10.9 | — | — | — | — | — | — |
| B | 0.10 | 0.02 | 0.03 | 0.04 | 0.02 | 9.9 | 4.25 | 15.0 | 12.0 | 13.5 | 16.5 | Brittle |
| C | 0.07 | 0.02 | 0.02 | 0.04 | 0.01 | 9.4 | 2.15 | 12.0 | 14.5 | 15.0 | 22.5 | Brittle |
| D | 0.08 | 0.02 | 0.02 | 0.03 | 0.02 | 9.8 | 3.9 | 13.0 | 13.5 | 14.5 | 16.5 | Fair |
| E | 0.11 | 0.02 | 0.05 | 0.05 | 0.007 | 9.6 | 2.95 | 13.0 | 13.5 | 14.5 | 19.5 | Fair |
| F | 0.10 | 0.02 | 0.01 | 0.04 | 0.03 | 9.6 | 2.5 | 12.5 | 14.0 | 15.5 | 22.0 | Best of Series |

While the preferred embodiment hereof is represented by a slip cast sanitary-ware body, as will be understood by those skilled in the art, the benefits of the present invention, though perhaps not as pronounced or dramatic as they appear in a sanitary-ware body, would quite likely be applicable to any fired, ceramic body; would definitely be applicable to any body which could be characterized by those skilled in this particular art, as a "feldspathic" body.

And, while the preferred embodiment hereof involves slip cast sanitary-ware, other than as slip solubility benefits are a consideration, the method of forming the body, whether by extrusion, dry pressing, etc., would have no bearing on the final results achieved, and as such, method of forming really forms no limiting feature of the invention disclosed herein.

The examples hereof amply demonstrate that the fine-grained diopside crystals of this invention lower the firing temperature of the feldspathic body disclosed by at least three Seger cones.

Obviously however, an amount of the crystals and/or frit of this invention which would promote any measurable reduction in firing temperature and/or time of a ceramic body would constitute a "fluxing amount." Certainly, lowering the required heat treatment even one Seger cone would involve a "fluxing amount" of the diopside crystals and/or glass of this invention.

Although the foregoing describes several embodiments of the present invention, it is understood that the invention may be practiced in still other forms within the scope of the following claims.

I claim:

1. A substantially completely vitreous, smelted, clear glass frit containing:
    (a) leachable amounts of deflocculent oxides and flocculent alkaline earths and adapted to serve as a ceramic body flux in a ceramic slip without thickening the slip to an unworkable viscosity,
    (b) said frit being completely liquid at a smelting temperature of about 2600° F. to about 2750° F. and containing in solution the diopside precursors CaO, MgO, and $SiO_2$, said frit consisting essentially of the following:

| | |
    |---|---|
    | CaO | 15 to 25 |
    | MgO | 10 to 20 |
    | $SiO_2$ | 35 to 50 |
    | Additive | 5 to 20 | said additive being selected from one or more of the following in approximately the percent indicated based on the total weight of the glass:

| | |
    |---|---|
    | $K_2O$ | 0 to 5 |
    | $Na_2O$ | 0 to 10 |
    | $Li_2O$ | 0 to 5 |
    | $Al_2O_3$ | 0 to 12, |

(c) said frit being adapted upon heating to crystallize from solution at least a fluxing amount of said precursors in the form of fine diopside crystals having an average particle size less than one micron and being substantially free of unreacted alkaline earths, and
    (d) said deflocculent oxides and flocculent alkaline earths being leachable from said frit in sufficient relative amounts to counterbalance each other and prevent said thickening of the slip to an unworkable viscosity.

2. The glass frit of claim 1 in which at least 50% by weight of said diopside precursors are converted to said diopside crystals during said heating.

3. The glass frit of claim 1 in which said heating is at a temperature from about Seger cone five (5) to about cone six (6).

4. The glass frit of claim 1 containing 0 to 3.6% $P_2O_5$.

* * * * *